US012273620B2

(12) United States Patent
Alsheuski

(10) Patent No.: US 12,273,620 B2
(45) Date of Patent: Apr. 8, 2025

(54) FOCUS INDICATION FOR MANUAL FOCUS ADJUSTMENTS

(71) Applicant: JSC Yukon Advanced Optics Worldwide, Vilneus (LI)

(72) Inventor: Aliaksandr Alsheuski, Vilnius (LI)

(73) Assignee: JSC Yukon Advanced Optics Worldwide, Vilneus (LT)

( * ) Notice: Subject to any disclaimer, the term of this patent is extended or adjusted under 35 U.S.C. 154(b) by 149 days.

(21) Appl. No.: 17/685,638

(22) Filed: Mar. 3, 2022

(65) Prior Publication Data

US 2023/0283896 A1    Sep. 7, 2023

(51) Int. Cl.
H04N 5/232     (2006.01)
H04N 23/63     (2023.01)
H04N 23/67     (2023.01)
H04N 23/80     (2023.01)

(52) U.S. Cl.
CPC .......... H04N 23/67 (2023.01); H04N 23/633 (2023.01); H04N 23/80 (2023.01)

(58) Field of Classification Search
CPC ....... H04N 23/67; H04N 23/80; H04N 23/633
See application file for complete search history.

(56) References Cited

U.S. PATENT DOCUMENTS 4,904,854 A * 2/1990 Ishida ............... G02B 7/346
                                              396/111
5,086,217 A * 2/1992 Ishida ............... G02B 7/346
                                              250/201.8
7,304,297 B1 * 12/2007 King ................. H04N 5/33
                                              250/252.1
2006/0044452 A1   3/2006 Hagino
2009/0091633 A1 * 4/2009 Tamaru .............. H04N 23/61
                                              348/208.14
2009/0091634 A1 * 4/2009 Kennedy ............ G02B 23/12
                                              250/214 AG (Continued)

FOREIGN PATENT DOCUMENTS

CN    106331496 A  *  1/2017   ......... H04N 5/23212
JP    2007256464 A  *  10/2007

(Continued)

OTHER PUBLICATIONS

Okazaki translation of JP 2010226588 A Mar. 2009 (Year: 2009).*

(Continued)

*Primary Examiner* — Zaihan Jiang
(74) *Attorney, Agent, or Firm* — Fish & Richardson P.C.

(57) ABSTRACT

An imaging device can provide an indication of a focus state of a displayed image to aid an operator to focus an image. The imaging device can include an image capture device configured form an image of a scene that includes an object viewed by the imaging device; a display to display the image the scene; a focus input to adjust a focus of the image displayed on the display; a hardware processor; and a memory storing computer-readable instructions, the instructions executable by the hardware processor to perform operations. The operations can include performing image processing on the image; determining a focus state of the image based on the image processing; and indicating a focus state of the image on the display.

20 Claims, 10 Drawing Sheets

(56) References Cited

U.S. PATENT DOCUMENTS

| | | | |
|---|---|---|---|
| 2013/0271637 A1* | 10/2013 | Park | H04N 23/62 |
| | | | 348/333.11 |
| 2015/0281780 A1* | 10/2015 | Daub | H04N 21/485 |
| | | | 725/19 |
| 2016/0165151 A1 | 6/2016 | Corlett | |
| 2016/0191995 A1* | 6/2016 | el Kaliouby | H04N 21/812 |
| | | | 725/12 |
| 2016/0361044 A1* | 12/2016 | Hibi | A61B 8/54 |
| 2019/0034706 A1* | 1/2019 | el Kaliouby | H04N 21/4223 |
| 2020/0134295 A1* | 4/2020 | el Kaliouby | G06V 10/82 |
| 2021/0125551 A1* | 4/2021 | Siddiqui | G06F 1/3212 |

FOREIGN PATENT DOCUMENTS

| | | | | |
|---|---|---|---|---|
| JP | 2010226588 A | * | 3/2009 | |
| JP | 2020038306 A | * | 3/2020 | |

OTHER PUBLICATIONS

Zhan, Jie translation of J CN 106331496 A Aug. 2016 (Year: 2016).*

Tanaka Masahito translation of JP 2020038306 A Sep. 2018 (Year: 2018).*

Takahara translation of JP 2007256464 A Mar. 22, 2006 (Year: 2006).*

International Search Report and Written Opinion in International Appln. No. PCT/EP2023/055048, mailed on May 4, 2023, 11 pages.

* cited by examiner

FOCUS INDICATION FOR MANUAL FOCUS ADJUSTMENTS

BACKGROUND

Imaging devices can use one or more lenses to bring images into focus. For example, an imaging device can include an objective lens and an ocular lens. As an example, the position of the objective lens and/or the ocular lens can be adjusted to alter the focus of the resulting image of objects in a scene. Focusing lenses can also be adjusted to bring resulting images into sharper focus.

SUMMARY

Aspects of the present disclosure pertain to an imaging device that includes an image capture device configured form an image of a scene that includes an object viewed by the imaging device; a display to display the image the scene; a focus input to adjust a focus of the image displayed on the display; a hardware processor; and a memory storing computer-readable instructions, the instructions executable by the hardware processor to perform operations. The imaging device can execute operations including performing image processing on the image; determining a focus state of the image based on the image processing; and indicating a focus state of the image on the display.

Aspects of the present disclosure can include a method that includes displaying, on a display of an imaging device, an image of an object in a scene; performing, by a hardware processor of the imaging device, image processing on the image; determining a focus state of the image based on the image processing; and indicating a focus state of the image on the display.

Aspects of the present disclosure can include a non-transitory, computer-readable medium storing instructions, the instructions executable by a hardware processor to perform operations including displaying, on a display of an imaging device, an image of an object in a scene; performing, by a hardware processor of the imaging device, image processing on the image; determining a focus state of the image based on the image processing; and indicating a focus state of the image on the display.

The foregoing and other implementations can each optionally include one or more of the following features, alone or in combination:

In some embodiments, determining the focus state of the image includes determining that the image displayed on the display is in focus; and the method includes indicating that the focus state of the image displayed is in focus.

In some embodiments, determining the focus state of the image includes determining that the image displayed on the display is out of focus; and the method includes indicating that the focus state of the image displayed is out of focus.

In some embodiments, the operations include indicating how to improve the focus state of the image displayed.

In some embodiments, performing image processing on the image includes performing contrast detection on the image.

In some embodiments, the operations include comparing a focus state of the image to a focus state of a previous image; determining that the focus state of the image is less focused than the focus state of the previous image; and indicating a focus input for increasing the focus of the image.

In some embodiments, wherein the imaging device includes a thermal imager or a night-vision imager.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements. Drawings are not to scale.

DETAILED DESCRIPTION

This disclosure describes devices and techniques for providing information to an operator of an imaging device indicating a focus state of the imaging device. An operator may use an imaging device to view a scene. The operator can manually focus the image of the scene by rotating a focus barrel to adjust focusing lens(es) or rotating an ocular piece. Imaging processing techniques can be used to determine whether the resulting image is in focus. If the resulting image is in focus, the imaging device can provide an indication to the operator that the imaging device is in focus. If the imaging device is out of focus, the imaging device can provide information to the operator that the image is out of focus and how the operator can bring the image into focus.

Figure 1:
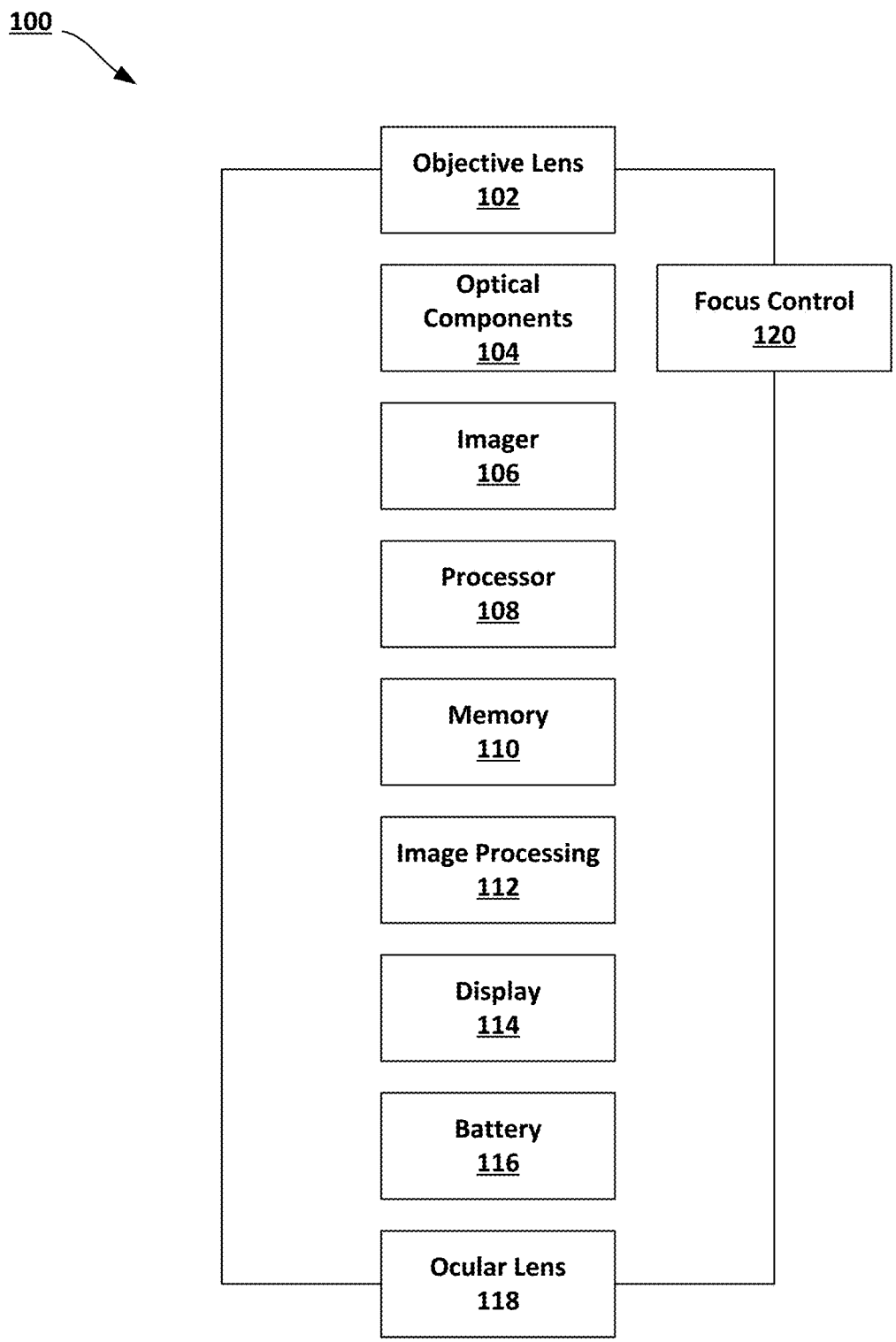
FIG. 1 is a schematic block diagram of an example optical device in accordance with embodiments of the present disclosure.

FIG. 1 is a schematic block diagram of an example imaging device 100 in accordance with embodiments of the present disclosure. The imaging device 100 can be any type of imaging device that includes manual focus capabilities. Such an imaging device 100 includes a thermal imaging rifle scope, thermal imaging binoculars, thermal imaging spotting scope, night-vision rifle scope, night-vision binoculars, night-vision spotting scope, optical scope, red dot sight, holographic sight, optical imager, or other type of imaging device.

Imaging device 100 can create and present (e.g., display) an image of a scene in real-time. Imaging device 100 can include an objective lens assembly 102, an ocular lens assembly 118, and other optical components 104, such as focusing lenses, emitters, an optical path, prisms, mirrors, etc. The objective lens assembly can include lenses and other optical components that can receive light or thermal radiation or other electromagnetic (EM) signals (referred to collectively as EM signals) from objects that make up a scene. In some embodiments, the imaging device includes focus control 120. Focus control 120 can be any type of mechanism that allows an operator of the imaging device to manually focus the image. Focus control 120 can manipulate one or more of the objective lens assembly 102, ocular lens assembly 118, one or more optical components 104, or other component to change the focus of the image. A focus control 120 can be a slider, button, dial, or other type of manual input. Focus control 120 can also be a digital control, such as an electric input or computer input. More details on the objective lens assembly 102, ocular lens assembly 117, and optical components 104 are provided in FIGS. 6A-B below.

The imaging device 100 can include an imager 106. Imager 106 can include a thermal imaging device, such as a thermal camera, thermal sensor, infrared sensor, charge coupled device (CCD), or other type of imager. Imager 106 can convert received EM signals into electrical signals for processing. For example, electrical signals representing objects from a scene can be sent from the imager 106 to processor 108. Processor 108 can be a hardware processor that can execute instructions stored in memory 110. Processor 108 can be a computer, such as that described in FIG. 7. Memory 110 can include non-transitory computer readable media storing instructions that, when executed, cause the processor to perform operations, including one or more image processing algorithms 112. Processor 108 can perform imaging processing on received electrical signals from imager 106 to render the electrical signals into a format for display on display 114. Image processing algorithms 112 can include image recognition, filter application, pixel analysis, contrast detection/measurement, or other image processing techniques.

The display 114 can include a liquid crystal display (LCD), light emitting diode (LED) display, or other type of display. Display 114 can provide a visual representation of the objects in the scene to an operator. In embodiments, display 114 can present a reticle or other aiming structure overlaid onto the displayed image (the term "reticle" will be used to include any type of aiming structure). The reticle can be used for aiming, target acquisition, windage and elevation determination, and other uses. A reticle can be a crosshair, a circle or concentric circles, triangles, series of lines or dots, squares, or other geometric structures.

In embodiments, the display 114 can also display information to an operator. For example, the display 114 can display distance information, magnification information, semantic information, object recognition information, imaging device modes (white hot vs dark hot), windage and elevation information, battery levels, object tracking information, focus information, or other information.

The imaging device 100 can include a power supply 116. Power supply 116 can be a battery, solar cell, external power supply, or other type of power supply. Power supply 116 can provide power to the processor 108, memory 110, display 114, and other components.

Image processing 112 includes functionality to determine if an image is in focus and/or if an image is more in focus or less in focus than a previous image. Processor 108 can determine whether an image is in focus (or more or less in focus than a previous image) based on one or more image processing techniques, and can display an indication of the focus state of the imaging device 100 to the operator. For example, an operator can manually adjust the focus of an image being displayed by the imaging device 100. As the displayed image is focused, imaging processing can be used to determine if the image is more in focus than a previous image. The focus state can be displayed to the operator. By using image processing techniques and providing focus feedback, the image can be brought into focus faster and more reliably. For example, an operator might focus and unfocus an image repeatedly to verify the optimal focus of the image. The image processing can determine the optimal focus and alert the operator. This alert can act as verification that the focus is optimal.

Figure 2B:
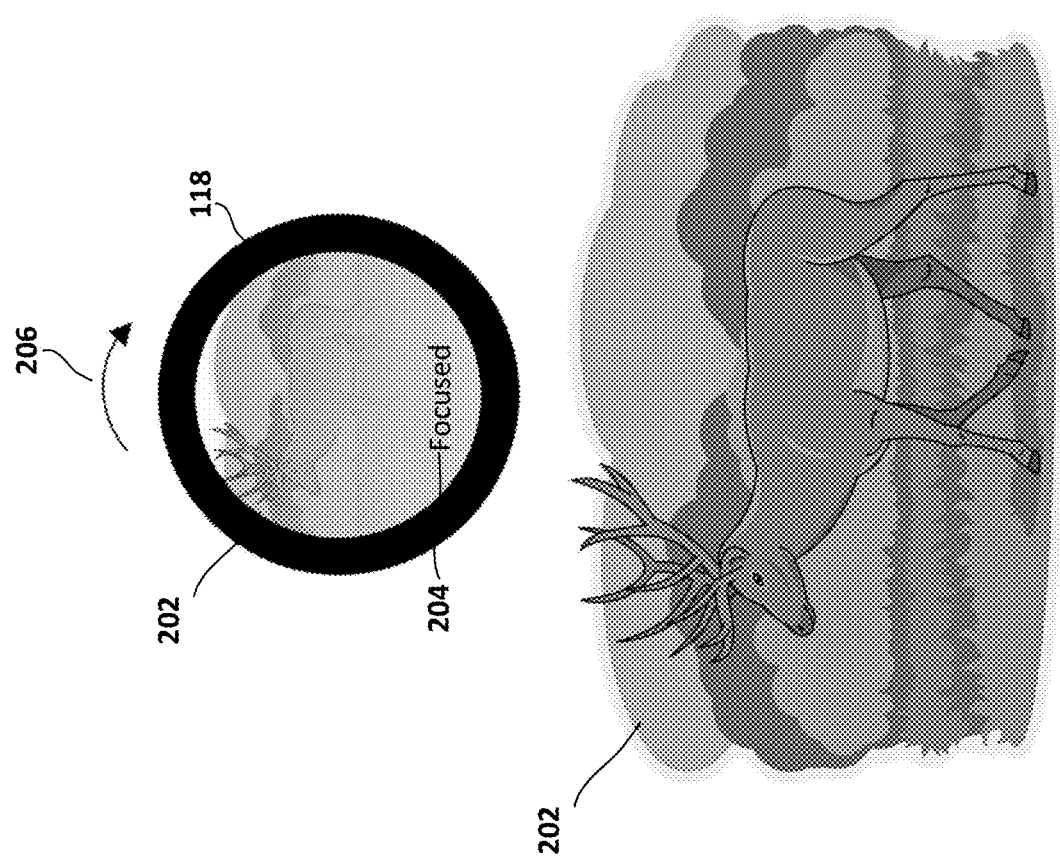
FIGS. 2A-D are schematic diagrams illustrating a focusing of a displayed image of a scene and focus feedback in accordance with embodiments of the present disclosure.
Figure 2A:
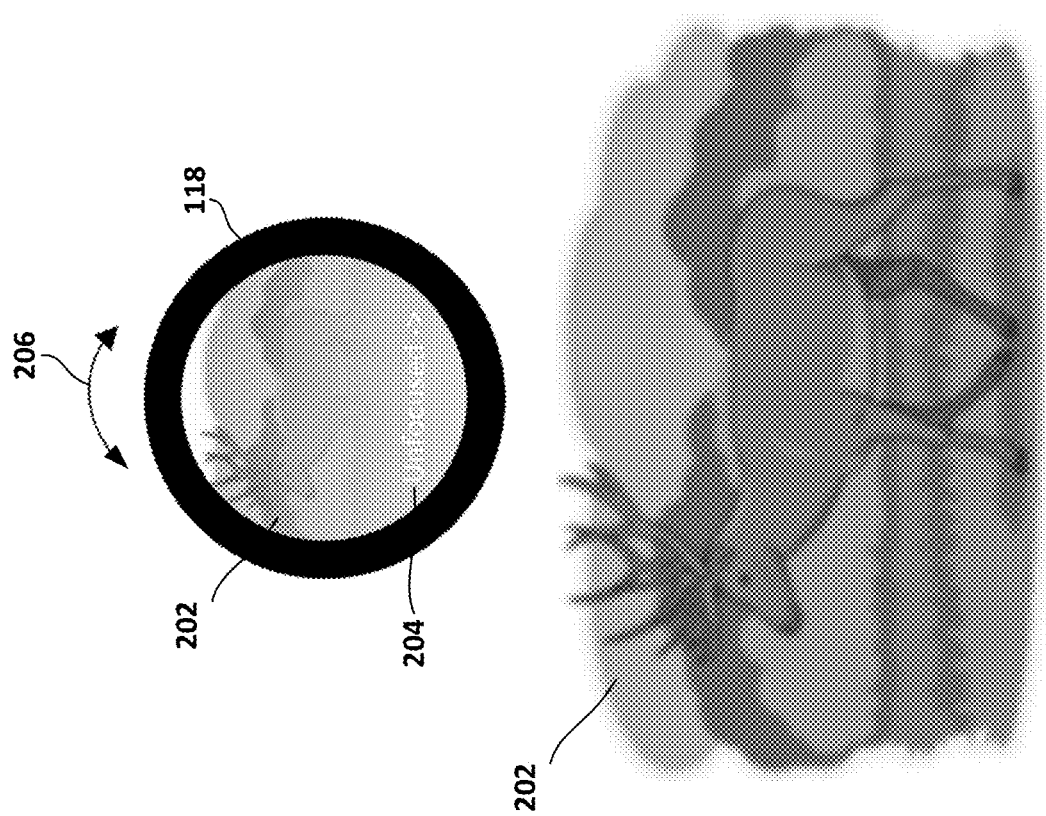

FIGS. 2A-D are schematic diagrams illustrating a focusing of a displayed image of a scene and focus feedback in accordance with embodiments of the present disclosure. In FIG. 2A, an imaging device 100 includes an ocular assembly 118. The ocular assembly 118 can be used to view the display of objects in a scene. In FIGS. 2A-D, the scene includes a deer in a grass area with trees and sky in the background. The object in this example is the deer. In FIG. 2A, the deer 202 is unfocused. The image processing can determine that the deer is unfocused using pixel analysis or other type of image processing. In some embodiments, the operator can indicate that the deer is unfocused. For example, a button can be pressed to indicate that the image is unfocused. Turning the focus knob or other control (focus knob for short) can also indicate that the image is unfocused. The focus state indicator 204 can be indicated to the operator. In this example, the focus state is displayed as text reading "unfocused." The operator turns the focus knob 206 clockwise or counter-clockwise to try to bring the deer 202 into focus. The operator might not know which way to turn the focus knob at first, so the operator might turn the focus knob the wrong direction. The image processing can determine whether a second image is more or less in focus than a previous image. If the image is more in focus (but not optimally focused), the display can indicate that the image is unfocused and can indicate a direction to turn the knob to increase the focus.

For example, in FIG. 2A, if the operator turns the focus knob 206 counter-clockwise, the image might become less focused than before. The display shows that the focus state is still "unfocused" and the display shows an arrow pointing to the right. The arrow pointing right can indicate to the operator to turn the focus knob 206 clockwise instead of counter-clockwise. In some embodiments, the focus state indicator 204 can change colors or provide other visual alerts when optimal focus has been reached.

Figure 2D:
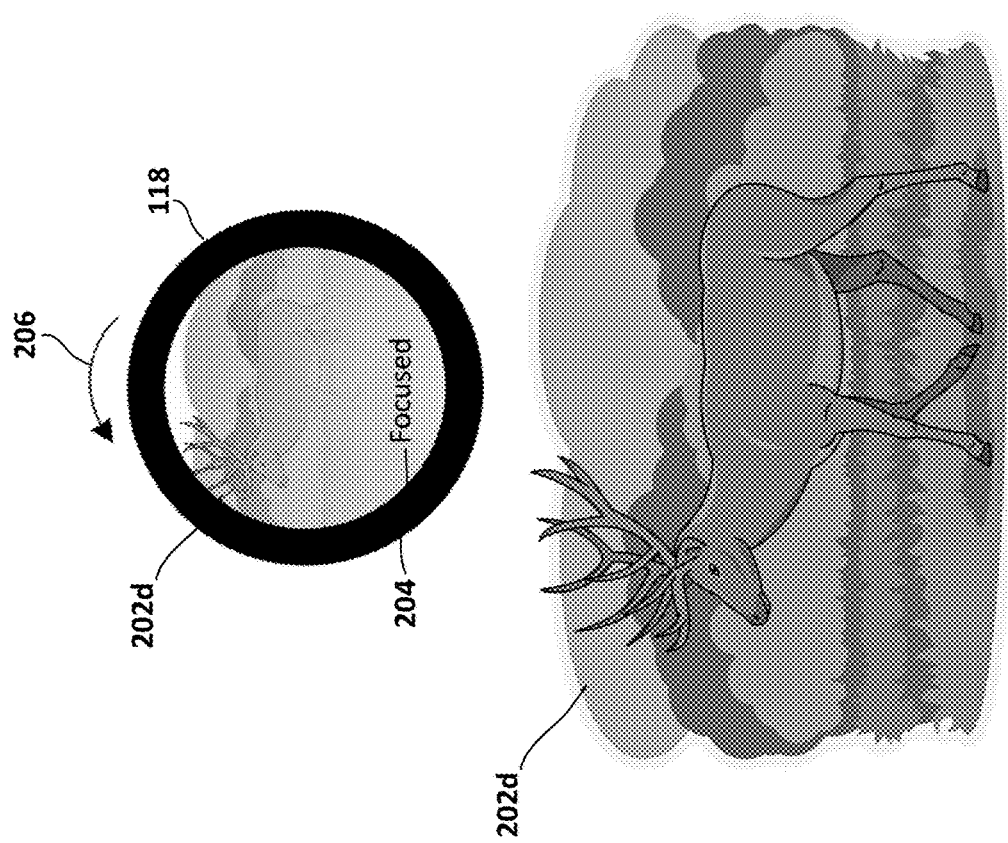
Figure 2C:
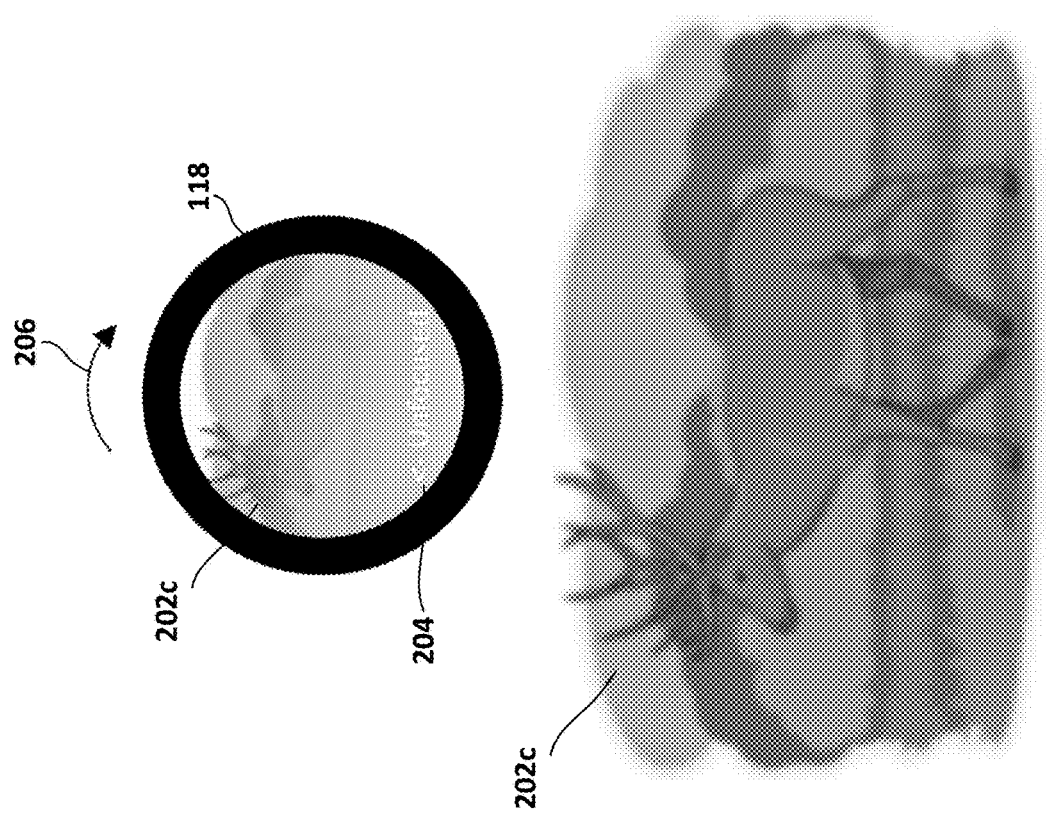

In FIG. 2B, the operator has turned the focus knob 206 clockwise and has brought the deer 202 into focus. The focus state indicator 204 indicates that the deer is in focus. However, in FIG. 2C, the operator might have continued turning the focus knob 202, bringing the deer 202 out of focus again. The image processing can determine that the current image of the deer 202 is out of focus and is less focused than the previous image. The focus state indicator 204 can indicate that the image is "unfocused" and also indicate a left arrow, alerting the operator to turn the focus knob 206 counter-clockwise to return the image to optical focus. FIG. 2D shows the deer 202 back in focus after the operator turns the focus knob counter-clockwise from FIG. 2C. The focus state indicator 204 shows that the image is in focus. If the operator turns the focus knob 206 too far counter-clockwise, the state would indicate something similar to that shown in FIG. 2A.

Figure 3A:
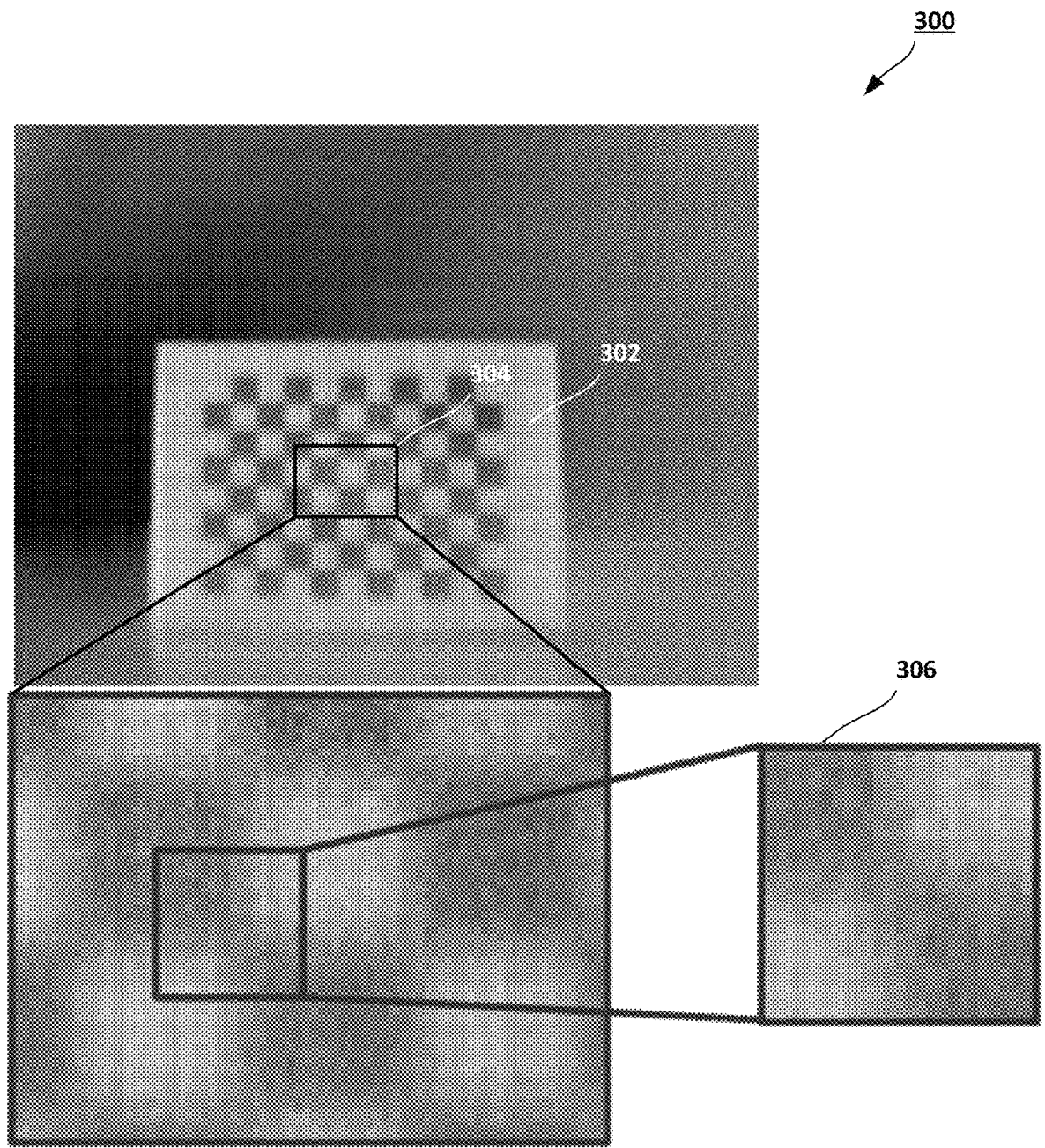
FIGS. 3A-B are schematic diagrams illustrating example pixel-level information for determining focus levels of an image in accordance with embodiments of the present disclosure.
Figure 3B:
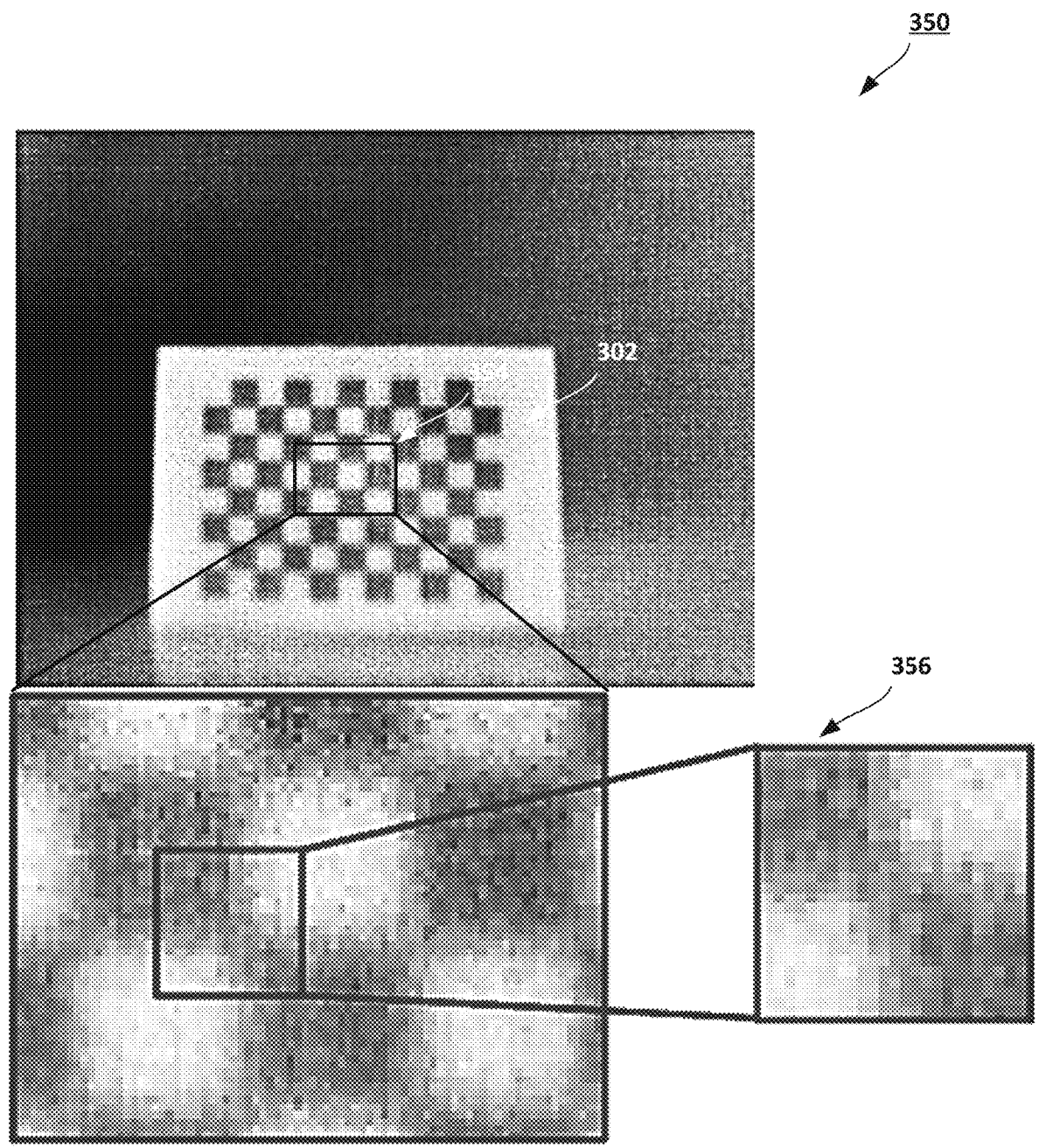

FIGS. 3A-B are schematic diagrams illustrating example pixel-level information for determining focus levels of an image in accordance with embodiments of the present disclosure. FIGS. 3A-B are representative images showing pixel comparisons between an unfocused image 300 and a more focused image 350. In FIG. 3A, a calibration grid 302 includes a black and white (or grey and white) checkerboard pattern. Close-up images 304 and 306 show how the blurriness of the image can be determined through pixel contrast detection. Specifically, in image close-up view 306, the pixel contrast can be determined to be low. For example, the pixels show that the transition between bright and dark pixel is gradual in view 306.

In FIG. 3B, the image 350 of the calibration grid 302 is more focused than the image 300 of calibration grid 302. Close-up images 354 and 356 show that the transition between bright and dark pixels is less gradual and more abrupt. The transition between bright and dark pixels in the image can be determined through contrast detection mechanisms as part of the image processing. Pixel analysis can also be used to determine focus. Gaussian Laplace filters can be used to determine pixel values to create a histogram (such as a contrast histogram). Pixel values from the histogram can be used to determine focus based on peak values and pixel value distribution. In some embodiment, the sum of the difference in adjacent pixel values can also be a way to determine contrast and focus.

Figure 4:
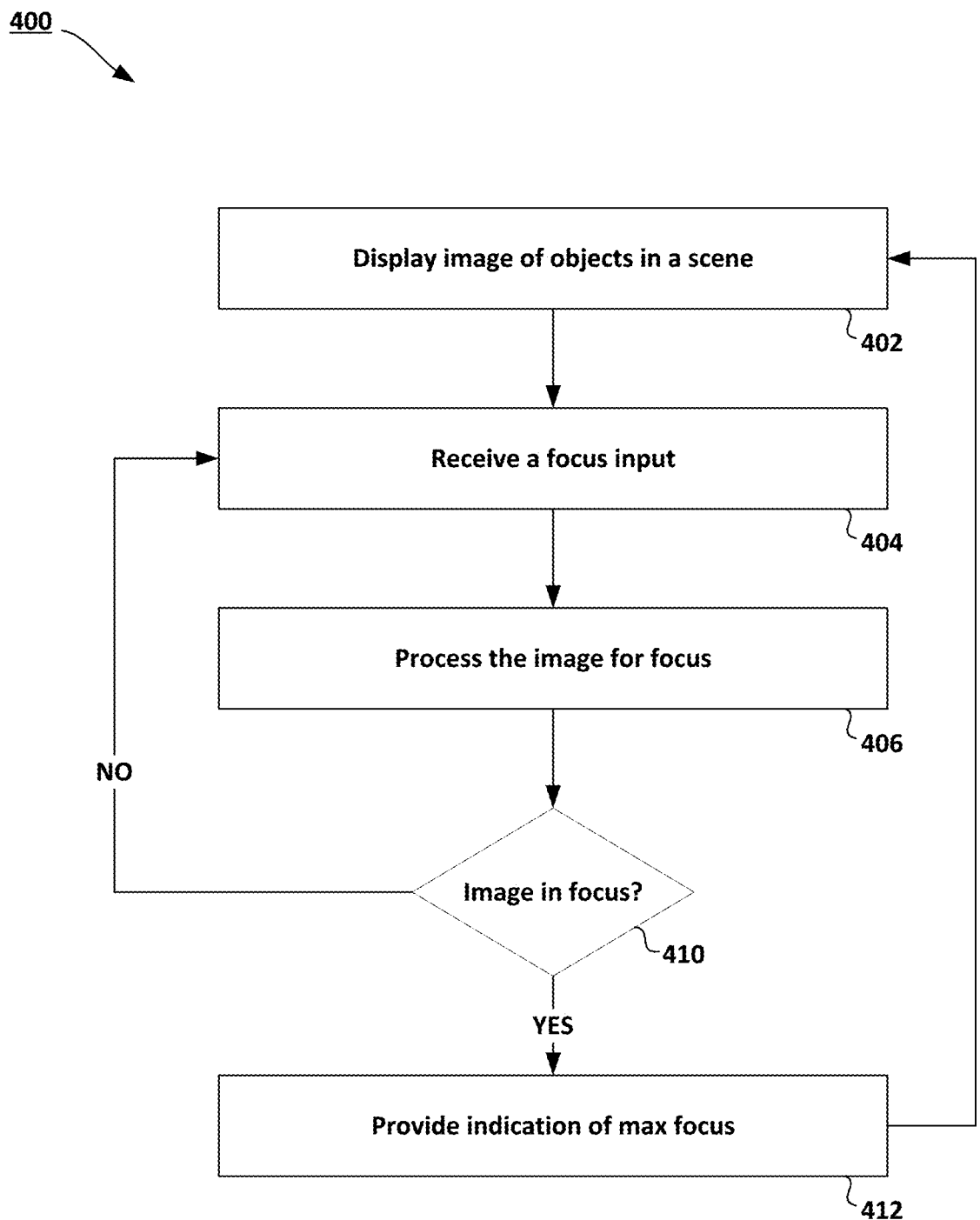
FIG. 4 is a process flow diagram for providing focus feedback in accordance with embodiments of the present disclosure.

FIG. 4 is a process flow diagram 400 for providing focus feedback in accordance with embodiments of the present disclosure. An operator can use an imaging device to view objects in a scene. The imaging device can display an image of the objects in the scene for displaying on a display and presented to the operator. (402) The imaging device can receiving a focus input from the operator. (404) The focus input adjusts a focus of the image displayed to the operator. In some embodiments, the focus input can act as a trigger to activate an image processing of the image to determine whether the image is in focus.

The images being displayed can be processed to determine whether the image is in focus. (406) If the image is in focus (410), an indication that the image is in focus can be displayed. If the image is not in focus (410), the imaging device continues to receive focus input until the image is in focus. (404)

Figure 5:
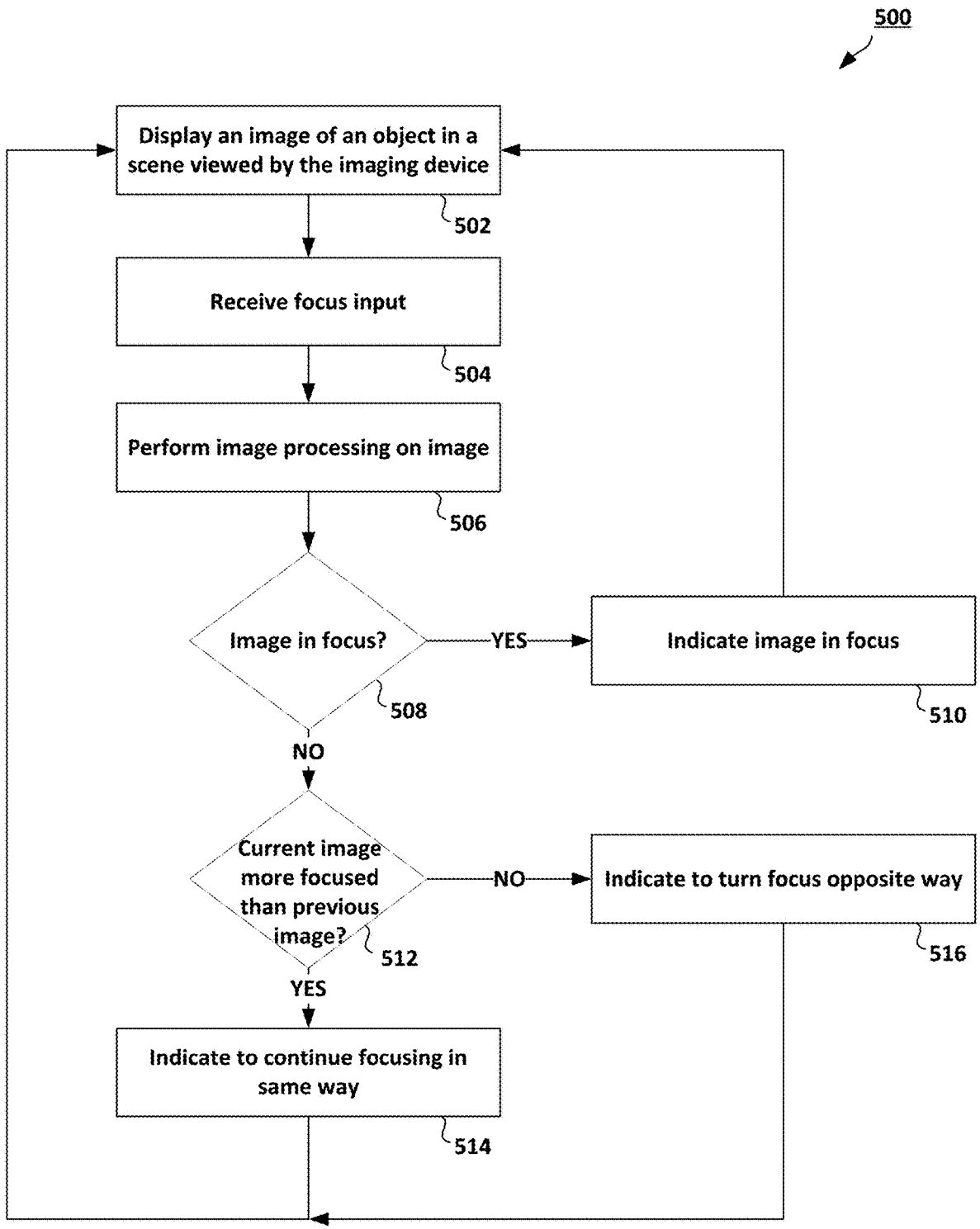
FIG. 5 is a process flow diagram for providing focus feedback in accordance with embodiments of the present disclosure.

FIG. 5 is a process flow diagram 500 for providing focus feedback in accordance with embodiments of the present disclosure. FIG. 5 illustrates an example process flow for providing focus state indications to an operator. At the outset, an image of an object in a scene is processed and displayed to an operator. (502) A focus input can be received. (504) Image processing can be performed on the image being displayed after the focus input has been received. (506)

If the focus input puts the image into focus (508), then the display can indicate that the image is in focus. (510) If the focus input does not put the image into focus (508), the imaging device can determine if the currently displayed image is more in focus that a previously displayed image. (512) If the focus input put the currently displayed image more in focus than the previously displayed image, then the imaging device can display an indication that the next focus input can be in the same direction as the previous focus input. (514) That is, the operator can continue focusing the image the same way or direction. If the focus input put the currently displayed image less in focus than the previously displayed image, then the imaging device can display an indication that the next focus input can be in the opposite direction as the previous focus input. (516)

The imaging device can continue displaying images and indicating the focus state on a display. If the image is in focus after some amount of time, the imaging device can stop displaying the focus state indication. The operator can also turn on and off the focus state indication. The operator can also activate or deactivate the focus state functionality. By turning off the focus state functionality, the operator can conserve power and processing resources.

Figure 6A:
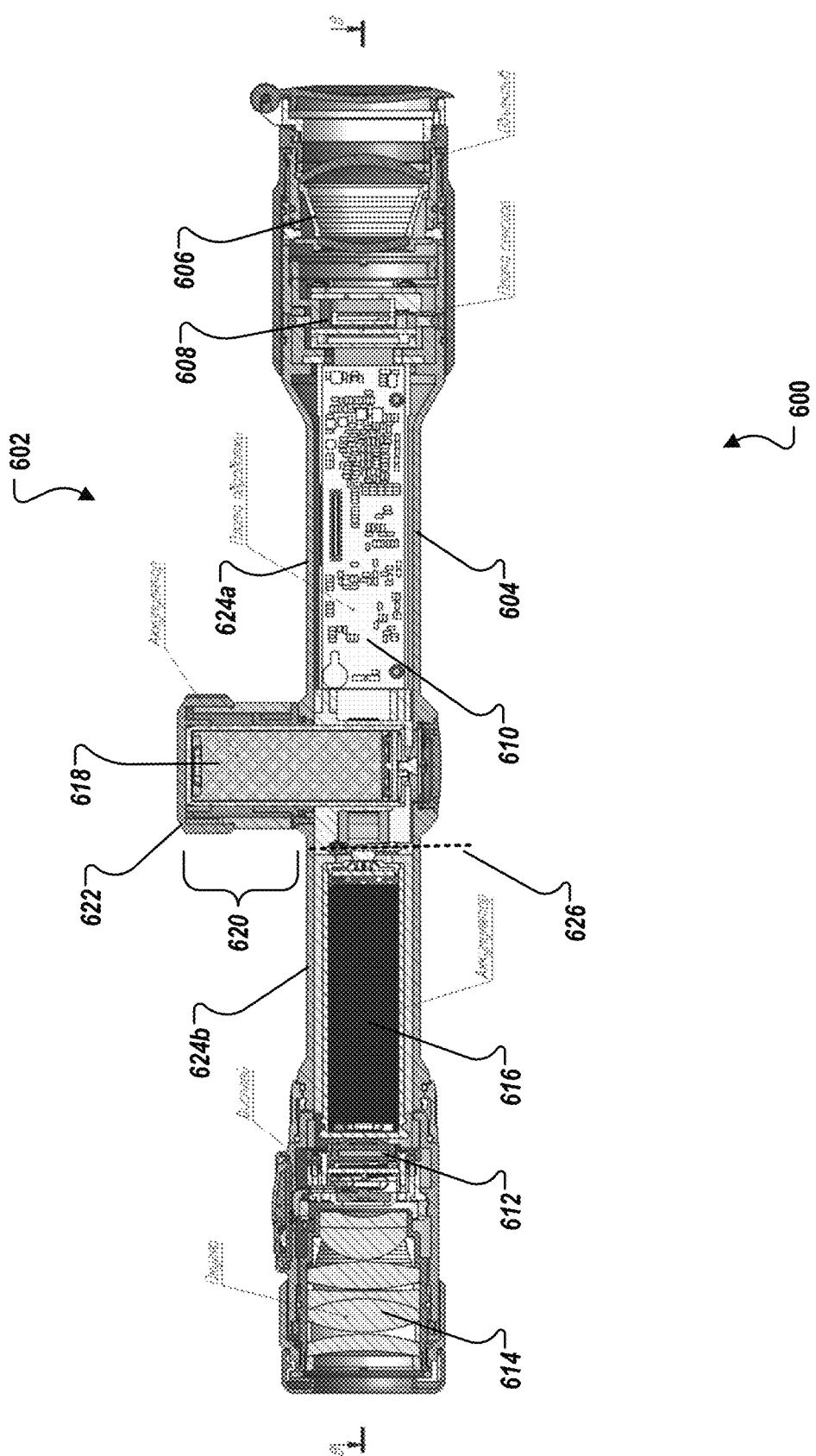
FIG. 6A is a schematic diagram illustrating a right-side, cut-away view of an example digitally-based, thermal scope configured in a conventional, optically-based scope form factor, according to an implementation of the present disclosure.
Figure 6B:
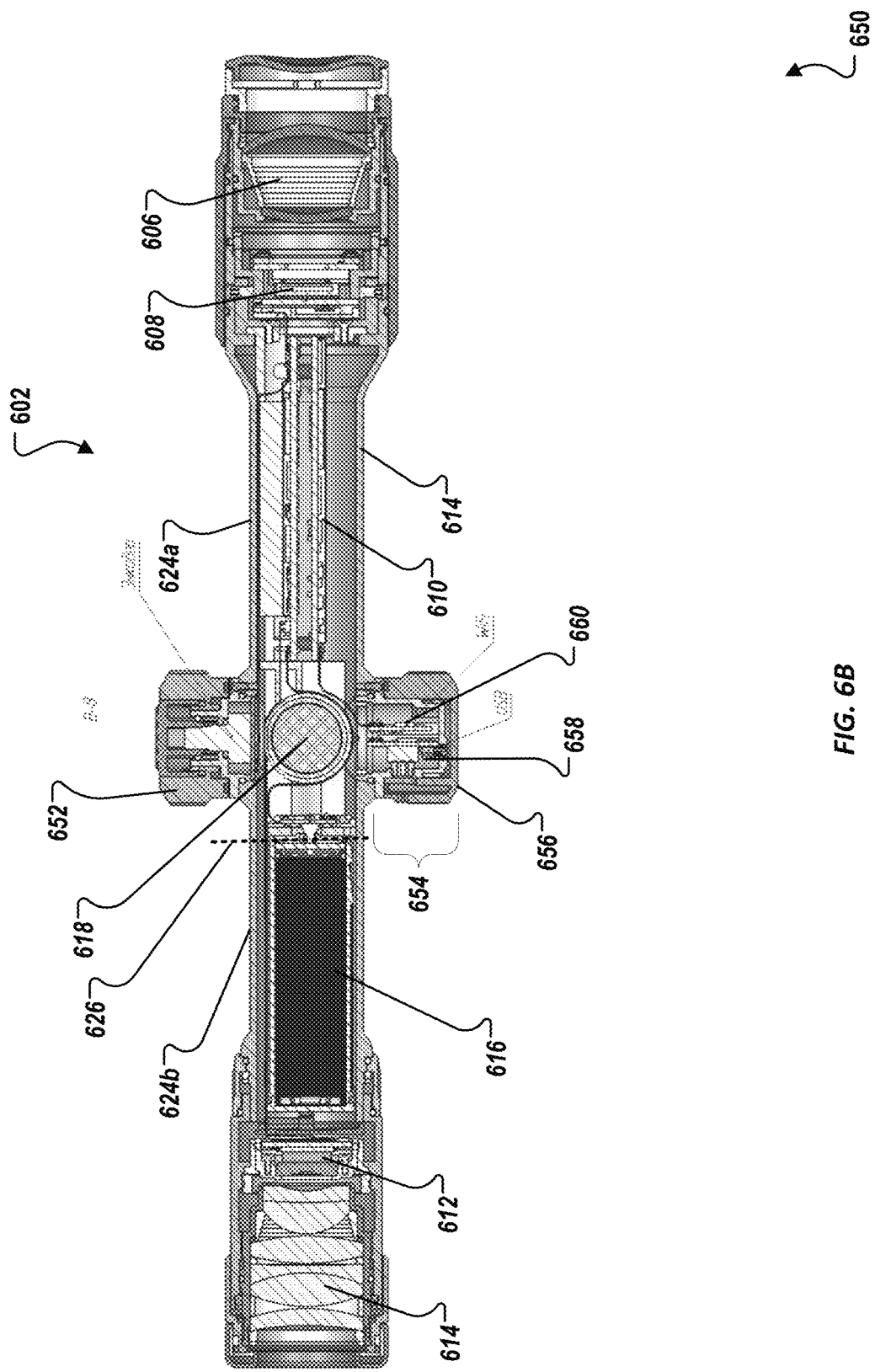
FIG. 6B is a schematic diagram illustrating a top, cut-away view of the example digitally-based, thermal scope of FIG. 6A configured in a conventional, optically-based scope form factor, according to an implementation of the present disclosure.

FIG. 6A is a schematic diagram illustrating a right-side, cut-away view 600 of an example digitally-based, thermal scope 602 according to implementations of the present disclosure. The illustrated digitally-based, thermal scope 602 in FIG. 6A includes a body 604, receiving optics 606, receiving optical sensor 608, processing electronics 610, viewing computer display 612, viewing optics 614, internal rechargeable battery 616, and user-replaceable battery 618 (within battery turret 620 and secured with a removable battery turret cap 622). Refer to FIG. 6B for two additional turret-type assemblies not displayed in FIG. 6A (that is, 652 and 654).

Body 604 is configured to permit mounting on equipment (for example, a firearm or tripod) using mounting systems similar to those used in mounting optically-based imaging devices. For example, the body 604 can be mounted to equipment at approximately positions 624a and 624b using a ring-type mounting system.

At a high-level, receiving optics 606 and receiving optical sensor 608 gather incoming electromagnetic radiation (for example, IR light) for computer processing. Data generated by the receiving optical sensor 608 (for example, a charged coupled device (CCD), complementary metal-oxide-semiconductor (CMOS), or quanta image sensor (QIS)) is processed by processing electronics 610 into image data to be recreated/represented on viewing computer display 612 (for example, a color/monochrome liquid crystal display (LCD) or organic light-emitting diode (OLED) display, or other similar/suitable display) and viewed through viewing optics 614.

Internal rechargeable battery 616 is used to provide power to components and functions associated with the illustrated digitally-based, thermal scope 602. For example, the internal rechargeable battery 616 can be used to power the receiving optical sensor 608, processing electronics 610 (and associated provided functionality), viewing computer display 612, data transfer interfaces (for example, universal serial bus (USB), FIREWIRE, and Wi-Fi), control mechanisms (for example, an integrated, rotary-type single control mechanism described in FIG. 6B), and other functions consistent with this disclosure (for example, displaying a reticle on the viewing computer display 612 and wired/wireless integration with a mobile computing device). In some implementations, the internal rechargeable battery 616 can include lead-acid, nickel-cadmium (NiCd), nickel-metal hydride (NiMH), lithium-ion (Li-ion), lithium-ion polymer (Li-ion polymer), or other suitable battery technologies consistent with this disclosure. In some implementations, the internal rechargeable battery 616 can be recharged from power supplied by a data transfer interface (for example, a USB port) or the user-replaceable battery 618. For example, processing electronics 610 can be configured to detect a low-charge state of the internal rechargeable battery 616 and pull power from the user-replaceable battery 618 to charge the internal rechargeable battery 616 to a minimum charge state (if possible).

In some implementations, the digitally-based, thermal scope 602 can be configured to use power from the user-replaceable battery 618 until reaching a minimum charge state, at which point the digitally-based, thermal scope 602 can switch to the internal rechargeable battery 616 (if of a sufficient charge state) or to be gracefully shut down due to lack of power. Once a charged user-replaceable battery 618 is re-installed, the digitally-based, thermal scope 602 can switch power consumption back to the user-replaceable battery 618. The user-replaceable battery 618 can be used to extend allowable time-of-use for the digitally-based, thermal scope 602. For example, a user can hot-swap the user-replaceable battery 618 when discharged with a fresh battery to keep the digitally-based, thermal scope 602 operating. In other implementations, the digitally-based, thermal scope 602 can be configured to use power from the internal rechargeable battery 616 until reaching a minimum charge state, at which point the digitally-based, thermal scope 602 can switch to the user-replaceable battery 618 (if present) or to be gracefully shut down due to lack of power. In some implementations, modes of battery operation (that is, primary and secondary battery usage) can be selectable by a user depending upon their particular needs.

In some implementations, an external power supply could power the digitally-based, thermal scope 602 and recharge the internal rechargeable battery 616 and user-replaceable battery 618 (if rechargeable). For example, the processing electronics 610 can be configured to determine, if external power is available (for example, using a USB port or other external port (not illustrated)) and whether the internal rechargeable battery 616 or user-replaceable battery 618 is in a low-power state. If power is available, power can be directed to recharge the internal rechargeable battery 616 or user-replaceable battery 618. In some implementations, the processing electronics 610 can trigger an indicator (for example, light-emitting diode (LED), audio chirp, viewing computer display 612, or other visual/audio indicator) that the internal rechargeable battery 616 or user-replaceable battery 618 is (or is about to be) discharged or is charging. In some implementations, the processing electronics 610 can be configured to transmit data to a mobile computing device to display a message to a user that the internal rechargeable battery 616 or user-replaceable battery 618 is discharged and needs replacement or is recharging. In some implementations, a rechargeable user-replaceable battery 618 can include lead-acid, nickel-cadmium (NiCad), nickel-metal hydride (NiMH), lithium-ion (Li-ion), lithium-ion polymer (Li-ion polymer), or other suitable battery technologies consistent with this disclosure.

In some implementations, the internal rechargeable battery 616 is not user replaceable and must be replace by an authorized service center. In other implementations, the body 604 can be configured to be separable (for example, at 626) to permit user replacement of the internal rechargeable battery 616. For example, once a rechargeable battery exceeds a certain number of recharge cycles, the battery is incapable of holding a desirable amount of charge. In this case, a user might with to replace the depleted internal rechargeable battery 616. In a particular example, the body 604 could be in two-piece configuration that is screwed together (for example, at 626) once the internal rechargeable battery 616 is installed. In this configuration, the two pieces of the body 604 can be unscrewed, separated, the internal rechargeable battery 616 replaced with a new battery, and the two pieces of the body 604 screwed back together. Other attachment mechanisms for the two pieces of the body 604 that are consistent with this disclosure are considered to be within the scope of this disclosure.

Battery turret 620 is configured to hold the user-replaceable battery 618. The removable battery turret cap 622 is used to secure the user-replaceable battery 618 within the battery turret 620. In some implementations, the user-replaceable battery 618 can be either rechargeable or non-rechargeable and varying form factors, such as a 123A, CR2032, AA, and AAA).

In some implementations, the battery turret cap 622 can be a pop-off, friction fit, or screw-type cap. In some implementations, the battery turret cap 622 can be retained to the digitally-based, thermal scope 602 using a wire loop, elastic band, or other retention mechanism to prevent the battery turret cap 622 from becoming separated from the digitally-based, thermal scope 602. In typical implementations, the battery turret cap 622 (or battery compartment 622) is configured with one or more O-rings or other seals to provide a water- and dust-proof compartment for the user-replaceable battery 618.

In some implementations, processing electronics 610 can also be configured to provide other functionality consistent with this disclosure. For example, processing electronics 610 can be configured to provide Wi-Fi, USB, streaming video, firmware upgrades, connectivity with mobile computing devices, control interfaces, and other functionality consistent with this disclosure associated with the digitally-based, thermal scope 602.

FIG. 6B is a schematic diagram illustrating a top, cut-away view 650 of the example digitally-based, thermal scope 602 of FIG. 6A configured in a conventional, optically-based scope form factor, according to an implementation of the present disclosure. As illustrated in FIG. 6B, the digitally-based, thermal scope 602 includes an integrated, push/rotary-type single control mechanism turret (control) 652 and data transfer interface turret 654. Other form factors are within the scope of this disclosure.

Control 652 can provide integrated control functionality associated with the digitally-based, thermal scope 602. For example, if the digitally-based, thermal scope 602 is powered off, a long push in of a "cap" configured into the control 652 can power on the digitally-based, thermal scope 602 (or conversely power off the digitally-based, thermal scope 602 if powered on). While looking through viewing optics 614 at the viewing computer display 612, rotary- and push-type actions of the control 652 can be used to navigate among displayed graphical user interface menus and select menu items. Any function provided by control 652 that is consistent with this disclosure is considered to be within the scope of this disclosure. In some implementations, a mobile computing device can be integrated with the digitally-based, thermal scope 602 (for example, using Wi-Fi) and provide an interface (for example, with a software application) to permit alternative configuration of the digitally-based, thermal scope 602.

Data transfer interface turret 654 is used to provide data transfer interfaces (for example, USB 658 and Wi-Fi 660) for the digitally-based, thermal scope 602. For example, in conjunction with the processing electronics 610, the described data transfer interface can provide Wi-Fi, USB, streaming video, firmware upgrades, connectivity with mobile computing devices, control interfaces, and other functionality consistent with this disclosure and associated with the digitally-based, thermal scope 602. In some implementations, the data transfer interfaces (for example, USB 658) can be used to provide external power to the digitally-based, thermal scope 602 to power digitally-based, thermal scope 602 functionality or to recharge the internal rechargeable battery 616 or user-replaceable battery 618.

In some implementations, data transfer interface turret 654 is configured with a removable turret cap 656. In some implementations, the turret cap 656 can be a pop-off, friction-fit, or screw-type cap. In some implementations, the turret cap 656 can be retained to the digitally-based, thermal scope 602 using a wire loop, elastic band, or other retention mechanism to prevent the turret cap 656 from becoming separated from the digitally-based, thermal scope 602. In typical implementations, the turret cap 656 (or data transfer interface turret 654) is configured with one or more O-rings or other seals to provide a water- and dust-proof compartment for the associated data transfer interfaces.

Note, while this disclosure has described configurations and functionality associated with a digitally-based imaging device sensitive to thermal electromagnetic radiation (for example, IR), as will be appreciated by those of ordinary skill in the art, the described subject matter is also applicable to implementations of digitally-based imaging devices sensitive to any other type of detectable electromagnetic radiation (for example, ultraviolet (UV) and visible/ambient/daylight). These other implementations are considered to be within the scope of this disclosure.

Figure 7:
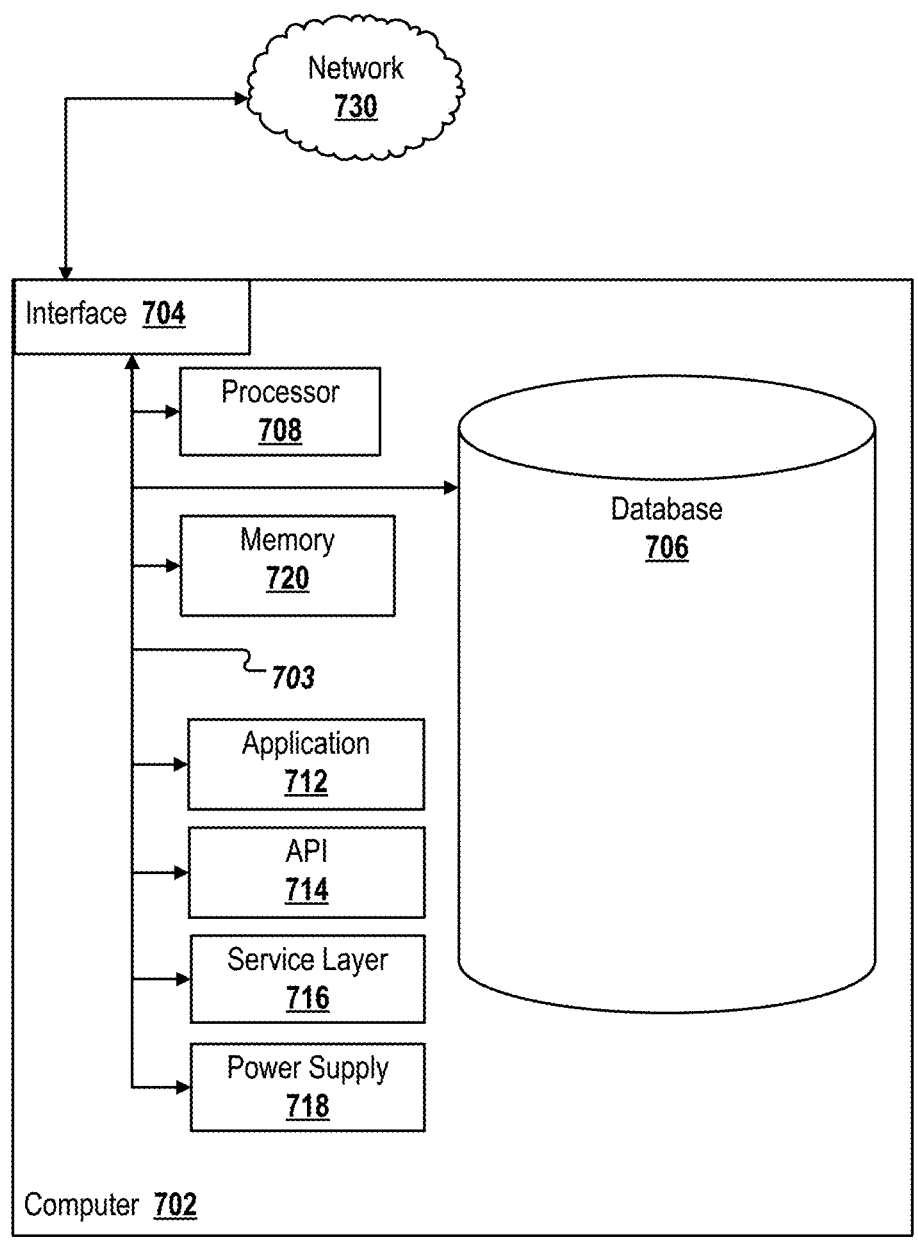
FIG. 7 is a block diagram illustrating an example of a computer-implemented system used to provide computational functionalities associated with described algorithms, methods, functions, processes, flows, and procedures, according to an implementation of the present disclosure.

FIG. 7 is a block diagram illustrating an example of a computer-implemented System 700 (for example, representing or as part of processing electronics 108) used to provide computational functionalities associated with described algorithms, methods, functions, processes, flows, and procedures, according to an implementation of the present disclosure. In the illustrated implementation, system 700 includes a computer 702 and a network 730.

The illustrated computer 702 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the computer 702 can include an input device, such as a keypad, keyboard, touch screen, another input device, or a combination of input devices that can accept user information, and an output device that conveys information associated with the operation of the computer 702, including digital data, visual, audio, another type of information, or a combination of types of information, on a graphical-type user interface (UI) (or GUI) or other UI.

The computer 702 can serve in a role in a distributed computing system as a client, network component, a server, a database or another persistency, another role, or a combination of roles for performing the subject matter described in the present disclosure. The illustrated computer 702 is communicably coupled with a network 730. In some implementations, one or more components of the computer 702 can be configured to operate within an environment, including cloud-computing-based, local, global, another environment, or a combination of environments.

At a high level, the computer 702 is an electronic computing device operable to receive, transmit, process, store, or manage data and information associated with the described subject matter. According to some implementations, the computer 702 can also include or be communicably coupled with a server, including an application server, e-mail server, web server, caching server, streaming data server, another server, or a combination of servers.

The computer 702 can receive requests over network 730 (for example, from a client software application executing on another computer 702) and respond to the received requests by processing the received requests using a software application or a combination of software applications. In addition, requests can also be sent to the computer 702 from internal users (for example, from a command console or by another internal access method), external or third-parties, or other entities, individuals, systems, or computers.

Each of the components of the computer 702 can communicate using a system bus 703. In some implementations, any or all of the components of the computer 702, including hardware, software, or a combination of hardware and software, can interface over the system bus 703 using an application programming interface (API) 714, a service layer 716, or a combination of the API 714 and service layer 716. The API 714 can include specifications for routines, data structures, and object classes. The API 714 can be either computer-language independent or dependent and refer to a complete interface, a single function, or even a set of APIs. The service layer 716 provides software services to the computer 702 or other components (whether illustrated or not) that are communicably coupled to the computer 702. The functionality of the computer 702 can be accessible for all service consumers using the service layer 716. Software services, such as those provided by the service layer 716, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 702, alternative implementations can illustrate the API 712 or the service layer 716 as stand-alone components in relation to other components of the computer 702 or other components (whether illustrated or not) that are communicably coupled to the computer 702. Moreover, any or all parts of the API 714 or the service layer 716 can be implemented as a child or a sub-module of another software module, enterprise application, or hardware module without departing from the scope of the present disclosure.

The computer 702 includes an interface 704. Although illustrated as a single interface 704, two or more interfaces 704 can be used according to particular needs, desires, or particular implementations of the computer 702. The interface 704 is used by the computer 702 for communicating with another computing system (whether illustrated or not) that is communicatively linked to the network 730 in a distributed environment. Generally, the interface 704 is operable to communicate with the network 730 and includes logic encoded in software, hardware, or a combination of software and hardware. More specifically, the interface 704 can include software supporting one or more communication protocols associated with communications such that the network 730 or hardware of interface 704 is operable to communicate physical signals within and outside of the illustrated computer 702. In an example, interface 704 can include USB, FIREWIRE, or Wi-Fi technologies.

The computer 702 includes a processor 708. Although illustrated as a single processor 705, two or more processors 708 can be used according to particular needs, desires, or particular implementations of the computer 702. Generally, the processor 708 executes instructions and manipulates data to perform the operations of the computer 702 and any algorithms, methods, functions, processes, flows, and procedures as described in the present disclosure.

The computer 702 also includes a database 706 that can hold data for the computer 702, another component communicatively linked to the network 730 (whether illustrated or not), or a combination of the computer 702 and another component. For example, database 706 can be an in-memory, conventional, or another type of database storing data consistent with the present disclosure. In some implementations, database 706 can be a combination of two or more different database types (for example, a hybrid in-memory and conventional database) according to particular needs, desires, or particular implementations of the computer 702 and the described functionality. Although illustrated as a single database 706, two or more databases of similar or differing types can be used according to particular needs, desires, or particular implementations of the computer 702 and the described functionality. While database 706 is illustrated as an integral component of the computer 702, in alternative implementations, database 706 can be external to the computer 702.

The computer 702 also includes a memory 720 that can hold data for the computer 702, another component or components communicatively linked to the network 730 (whether illustrated or not), or a combination of the computer 702 and another component. memory 720 can store any data consistent with the present disclosure. In some implementations, memory 720 can be a combination of two or more different types of memory (for example, a combination of semiconductor and magnetic storage) according to particular needs, desires, or particular implementations of the computer 702 and the described functionality. Although illustrated as a single memory 720, two or more memories 720 or similar or differing types can be used according to particular needs, desires, or particular implementations of the computer 702 and the described functionality. While memory 720 is illustrated as an integral component of the computer 702, in alternative implementations, memory 720 can be external to the computer 702.

The application 712 is an algorithmic software engine providing functionality according to particular needs, desires, or particular implementations of the computer 702, particularly with respect to functionality described in the present disclosure. For example, application 712 can serve as one or more components, modules, or applications. Further, although illustrated as a single application 712, the application 712 can be implemented as multiple applications 708 on the computer 702. In addition, although illustrated as integral to the computer 702, in alternative implementations, the application 712 can be external to the computer 702.

The computer 702 can also include a power supply 718. The power supply 718 can include a rechargeable or non-rechargeable battery that can be configured to be either user- or non-user-replaceable. In some implementations, the power supply 718 can include power-conversion or management circuits (including recharging, standby, or another power management functionality). In some implementations, the power supply 718 can include a power plug to allow the computer 702 to be plugged into a wall socket or another power source to, for example, power the computer 702 or recharge a rechargeable battery.

There can be any number of computers 702 associated with, or external to, a computer system containing computer 702, each computer 702 communicating over network 730. Further, the term "client," "user," or other appropriate terminology can be used interchangeably, as appropriate, without departing from the scope of the present disclosure. Moreover, the present disclosure contemplates that many users can use one computer 702, or that one user can use multiple computers 702.

Described implementations of the subject matter can include one or more features, alone or in combination.

Example 1 is n imaging device including an image capture device configured form an image of a scene that includes an object viewed by the imaging device; a display to display the image the scene; a focus input to adjust a focus of the image displayed on the display; a hardware processor; and a memory storing computer-readable instructions, the instructions executable by the hardware processor to perform operations including: performing image processing on the image; determining a focus state of the image based on the image processing; and indicating a focus state of the image on the display.

Example 2 may include the subject matter of example 1, wherein: determining the focus state of the image includes determining that the image displayed on the display is in focus; and the operations include indicating that the focus state of the image displayed is in focus.

Example 3 may include the subject matter of any of examples 1-2, wherein determining the focus state of the image includes determining that the image displayed on the display is out of focus; and the operations include indicating that the focus state of the image displayed is out of focus.

Example 4 may include the subject matter of example 3, the operations including indicating how to improve the focus state of the image displayed.

Example 5 may include the subject matter of any of examples 1-4, wherein performing image processing on the image includes performing contrast detection on the image.

Example 6 may include the subject matter of any of examples 1-6, and also include comparing a focus state of the image to a focus state of a previous image; determining that the focus state of the image is less focused than the focus state of the previous image; and indicating a focus input for increasing the focus of the image.

Example 7 may include the subject matter of any of examples 1-6, wherein the imaging device includes a thermal imager or a night-vision imager.

Example 8 is a method including displaying, on a display of an imaging device, an image of an object in a scene; performing, by a hardware processor of the imaging device, image processing on the image; determining a focus state of the image based on the image processing; and indicating a focus state of the image on the display.

Example 9 may include the subject matter of example 8, determining the focus state of the image includes determining that the image displayed on the display is in focus; and indicating that the focus state of the image displayed is in focus.

Example 10 may include the subject matter of any of examples 8-9, and can also include determining that the image displayed on the display is out of focus; and indicating that the focus state of the image displayed is out of focus.

Example 11 may include the subject matter of example 10, and can also include indicating how to improve the focus state of the image displayed.

Example 12 may include the subject matter of any of examples 8-11, and can also include performing contrast detection on the image.

Example 13 may include the subject matter of any of examples 8-12, and can also include comparing a focus state of the image to a focus state of a previous image; determining that the focus state of the image is less focused than the focus state of the previous image; and indicating a focus input for increasing the focus of the image on the display.

Example 14 is a non-transitory, computer-readable medium storing instructions, the instructions executable by a hardware processor to perform operations including displaying, on a display of an imaging device, an image of an object in a scene; performing, by a hardware processor of the imaging device, image processing on the image; determining a focus state of the image based on the image processing; and indicating a focus state of the image on the display.

Example 15 may include the subject matter of example 14, the operations further including determining the focus state of the image includes determining that the image displayed on the display is in focus; and indicating that the focus state of the image displayed is in focus.

Example 16 may include the subject matter of any of examples 14-15, the operations further including determining that the image displayed on the display is out of focus; and indicating that the focus state of the image displayed is out of focus.

Example 17 may include the subject matter of example 16, the operations further including indicating how to improve the focus state of the image displayed.

Example 18 may include the subject matter of any of examples 14-17, the operations further including performing contrast detection on the image.

Example 19 may include the subject matter of any of examples 14-18, the operations further including comparing a focus state of the image to a focus state of a previous image; determining that the focus state of the image is less focused than the focus state of the previous image; and indicating a focus input for increasing the focus of the image on the display.

What is claimed is:

1. An imaging device comprising:
   an image capture device configured to form an image of a scene that includes an object viewed by the imaging device;
   a display to display the image the scene;
   a focus control to adjust a focus of the image displayed on the display;
   a hardware processor; and
   a memory storing computer-readable instructions, the instructions executable by the hardware processor to perform operations comprising:
   performing image processing on the image;
   determining a focus state of the image based on the image processing;
   indicating the focus state of the image on the display, wherein indicating the focus state of the image comprises indicating that the image is out of focus and indicating a direction to manually adjust the focus for improving the focus of the image;
   wherein determining the focus state of the image comprises comparing a focus state of the image to a focus state of a previous image; and
   wherein indicating the focus state of the image comprise indicating a focus input for increasing the focus of the image based on determining whether the focus state of the image is less focused than the focus state of the previous image.

2. The imaging device of claim 1, the operations further comprising:
   receiving a manual adjustment to the focus of the image;
   determining the focus state of the image comprises determining that the image displayed on the display is in focus; and
   indicating that the focus state of the image displayed is in focus.

3. The imaging device of claim 1, wherein:
   determining the focus state of the image comprises determining that the image displayed on the display is out of focus; and
   the operations include indicating that the focus state of the image displayed is out of focus.

4. The imaging device of claim 3, the operations comprising indicating a manual focus adjustment direction indicator indicating how to improve the focus state of the image displayed.

5. The imaging device of claim 1, wherein:
   performing image processing on the image comprises performing contrast detection on the image.

6. The imaging device of claim 1, wherein indicating the focus input based on determining whether the focus state of the image is less focused than the focus state of the previous image comprises:
   determining that the focus state of the image is less focused than the focus state of the previous image; and
   indicating that a next focus input to be in an opposite direction as a previous focus input.

7. The imaging device of claim 1, wherein the imaging device comprises a thermal imager or a night-vision imager.

8. The imaging device of claim 1, wherein indicating the focus input based on determining whether the focus state of the image is less focused than the focus state of the previous image comprises:
   determining that the focus state of the image is more focused than the focus state of the previous image; and
   indicating that a next focus input to be in a same direction as a previous focus input.

9. A method comprising:
   displaying, on a display of an imaging device, an image of an object in a scene;
   performing, by a hardware processor of the imaging device, image processing on the image;
   determining a focus state of the image based on the image processing;
   indicating the focus state of the image on the display, wherein indicating the focus state of the image comprises indicating that the image is out of focus and indicating a direction to manually adjust the focus for improving the focus of the image;
   wherein determining the focus state of the image comprises comparing a focus state of the image to a focus state of a previous image; and
   wherein indicating the focus state of the image comprises indicating a focus input for increasing the focus of the image based on determining whether the focus state of the image is less focused than the focus state of the previous image.

10. The method of claim 9, further comprising:
    receiving a manual adjustment to the focus of the image;
    determining the focus state of the image comprises determining that the image displayed on the display is in focus; and
    indicating that the focus state of the image displayed is in focus.

11. The method of claim 9, comprising:
    determining that the image displayed on the display is out of focus; and
    indicating that the focus state of the image displayed is out of focus.

12. The method of claim 11, comprising indicating a manual focus adjustment direction indicator indicating how to improve the focus state of the image displayed.

13. The method of claim 9, comprising performing contrast detection on the image.

14. The method of claim 9, wherein indicating the focus input based on determining whether the focus state of the image is less focused than the focus state of the previous image comprises:

determining that the focus state of the image is less focused than the focus state of the previous image; and indicating that a next focus input to be in an opposite direction as a previous focus input.

15. A non-transitory, computer-readable medium storing instructions, the instructions executable by a hardware processor to perform operations comprising:

displaying, on a display of an imaging device, an image of an object in a scene;

performing, by a hardware processor of the imaging device, image processing on the image;

determining a focus state of the image based on the image processing;

indicating the focus state of the image on the display, wherein indicating the focus state of the image comprises indicating that the image is out of focus and indicating a direction to manually adjust the focus for improving the focus of the image;

wherein determining the focus state of the image comprises comparing a focus state of the image to a focus state of a previous image; and wherein indicating the focus state of the image comprises indicating a focus input for increasing the focus of the image based on determining whether the focus state of the image is less focused than the focus state of the previous image.

16. The non-transitory, computer-readable medium storing instructions of claim 15, the operations further comprising:

receiving a manual adjustment to the focus of the image;

determining the focus state of the image comprises determining that the image displayed on the display is in focus; and indicating that the focus state of the image displayed is in focus.

17. The non-transitory, computer-readable medium storing instructions of claim 15, the operations further comprising:

determining that the image displayed on the display is out of focus; and indicating that the focus state of the image displayed is out of focus.

18. The non-transitory, computer-readable medium storing instructions of claim 17, the operations further comprising indicating a manual focus adjustment direction indicator indicating how to improve the focus state of the image displayed.

19. The non-transitory, computer-readable medium storing instructions of claim 15, the operations further comprising performing contrast detection on the image.

20. The non-transitory, computer-readable medium storing instructions of claim 15, wherein indicating the focus input based on determining whether the focus state of the image is less focused than the focus state of the previous image comprises:

determining that the focus state of the image is less focused than the focus state of the previous image; and indicating that a next focus input to be in an opposite direction as a previous focus input.

\* \* \* \* \*

UNITED STATES PATENT AND TRADEMARK OFFICE
CERTIFICATE OF CORRECTION

PATENT NO. : 12,273,620 B2
APPLICATION NO. : 17/685638
DATED : April 8, 2025
INVENTOR(S) : Aliaksandr Alsheuski Page 1 of 1

It is certified that error appears in the above-identified patent and that said Letters Patent is hereby corrected as shown below:

On the Title Page

Column 1, (71) (Applicant), Line 2, delete "Vilneus (LI)" and replace with -- Vilnius (LT) --

Column 1, (72) (Inventor), Line 1, delete "(LI)" and replace with -- (LT) --

Column 1, (73) (Assignee), Line 2, delete "Vilneus" and replace with -- Vilnius --

Signed and Sealed this
Twenty-seventh Day of May, 2025

Coke Morgan Stewart
*Acting Director of the United States Patent and Trademark Office*